United States Patent [19]

Hwang et al.

[11] Patent Number: 5,657,939
[45] Date of Patent: Aug. 19, 1997

[54] IDLER GEAR TRANSFER CONTROL APPARATUS FOR REEL DRIVE APPARATUS OF A VIDEO CASSETTE TAPE RECORDER

[75] Inventors: Haksun Hwang; Inki Cheon, both of Seoul; Sang Jig Lee, Kyungki-Do; Pohyoung Koh, Kyungki-Do; Hyeoksoo Park, Kyungki-Do; Sungwoo Choi, Kyungki-Do, all of Rep. of Korea

[73] Assignee: LG Electronics Inc., Seoul, Rep. of Korea

[21] Appl. No.: 559,462

[22] Filed: Nov. 15, 1995

[30] Foreign Application Priority Data

Nov. 15, 1994 [KR] Rep. of Korea ............... 30194/1994

[51] Int. Cl.⁶ .................................................. G11B 15/26
[52] U.S. Cl. ..................................................... 242/356
[58] Field of Search ........................... 242/356, 356.7; 360/95, 96.3, 96.4

[56] References Cited

U.S. PATENT DOCUMENTS

| 5,289,989 | 3/1994 | Park | 242/356 |
| 5,295,638 | 3/1994 | Lee | 242/356 |
| 5,511,738 | 4/1996 | Seo et al. | 242/356 |

FOREIGN PATENT DOCUMENTS

| 62-14359 | 1/1987 | Japan | 360/96.3 |
| 1-10451 | 1/1989 | Japan | 360/96.3 |

Primary Examiner—John P. Darling

[57] ABSTRACT

An idler gear transfer control apparatus for a reel drive apparatus of a VCR, is disclosed, wherein the VCR includes a reversible motor, a base, a shaft disposed at the base, an input gear rotatably disposed on the shaft for receiving a driving force from the motor, and an idler arm having one end rotatably connected to the shaft and another end carrying an idler gear connected to the input gear, the idler arm being movable about the shaft for engaging the input gear, the idler arm being movable about the shaft for engaging the idler gear selectively with a supply reel gear or a take-up reel gear, whereby the driving force of the motor is selectively transferred to the supply reel gear or the tape-up reel gear in accordance with a rotation direction of the input gear. The idler gear transfer control apparatus includes a plurality of stoppers provided at the one end of the idler arm connected to the shaft for limiting the movements of the idler arm, and a cassette lock release having a flat top surface for selectively engaging with the stoppers, wherein the idler gear is moved by the driving force of the motor and contacts the supply reel gear or the take-up reel gear, before or at the same time one of the stoppers contacts the flat top surface of the cassette lock release.

19 Claims, 3 Drawing Sheets

IDLER GEAR TRANSFER CONTROL APPARATUS FOR REEL DRIVE APPARATUS OF A VIDEO CASSETTE TAPE RECORDER

BACKGROUND OF THE INVENTION

1. Field of the Invention

The present invention relates to an idler gear transfer control apparatus for a reel drive apparatus for a video cassette tape recorder (hereinafter called a "VCR"), and in particular to an improved idler gear transfer control apparatus for a reel drive apparatus of a VCR capable of maintaining proper distances between an idler gear and a supply reel gear and between the idler gear and a take-up reel gear, when a video cassette tape recorder is driven, by providing a plurality of stoppers at an idler arm.

2. Description of the Conventional Art

Referring to FIG. 1, a conventional reel drive apparatus for a video cassette tape recorder includes an output gear 2 drivingly connected to a capstan motor 1, and an idler unit 10 drivingly connected to the output gear 2 by a belt 3.

The idler unit 10 includes an input gear 11 having a pulley for receiving a driving force of the output gear 2 through the belt 3, an idler arm 12 pivotally engaged at its inner end to a shaft 11a of the input gear 11, and an idler gear 13 intermeshed with the input gear 11.

A cassette lock releaser 14 is fixed to the shaft 11a of the input gear 11, and a supply reel gear 4 and a take-up reel gear 5 are respectively disposed at both sides of the idler gear 13.

The operation of the conventional reel drive apparatus for a VCR will now be explained.

As the output gear 2 rotates by a driving force of the capstan motor 1, and the driving force is transferred to the pulley of the input gear 11 through the belt 3, the driving force of the input gear is selectively transferred to either the supply reel gear 4 or the take-up reel gear 5, whichever is selectively engaged to the idler gear 13.

In more detail, when the input gear 11 rotates in the direction "A" as shown in FIG. 1, the idler arm 12 moves in a leftward direction and becomes intermeshed with the supply reel gear 4, so that the driving force is transferred to the supply reel gear 4.

Therefore, the supply reel gear 4 rotates in the direction of the arrow as shown in FIG. 1.

Meanwhile, when the input gear 11 rotates in the direction "A" as shown in FIG. 1, the idler arm 12 moves to the fight and becomes intermeshed with the take-up reel gear 5, so that the driving force is transferred to the take-up reel gear 5.

Therefore, the take-up reel gear 5 rotates in the direction of the arrow as shown in FIG. 1.

However, the conventional VCR has disadvantages in that when the idler gear moves toward the supply reel or the take-up reel, since there is lacking any control member to properly control a distance between the idler gear and the supply reel gear and between the idler gear and the take-up reel gear, it is impossible to maintain a proper distance therebetween, so that an audible noise occurs when the system is in operation. In addition, there may occur inaccurate contacts therebetween.

SUMMARY OF THE INVENTION

Accordingly, it is an object of the present invention to provide an idler gear transfer control apparatus for a reel drive apparatus of a VCR, which overcomes the problems encountered in the conventional idler gear transfer control apparatus for a reel drive apparatus of a VCR.

It is another object of the present invention to provide an improved idler gear transfer control apparatus for a red drive apparatus of a VCR capable of maintaining proper distance between an idler gear and a supply reel gear and between the idler gear and a take-up reel gear, when a video cassette tape recorder is driven, by providing a plurality of stoppers at an idler arm.

To achieve the above objects, there is provided an idler gear transfer control apparatus for a reel drive apparatus of a VCR, which includes a plurality of spaced-apart stoppers integrally provided at an idler arm pivoted to a shaft for limiting a movement of the idler arm, thus preventing an audible noise in the system and malfunctions in the same.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
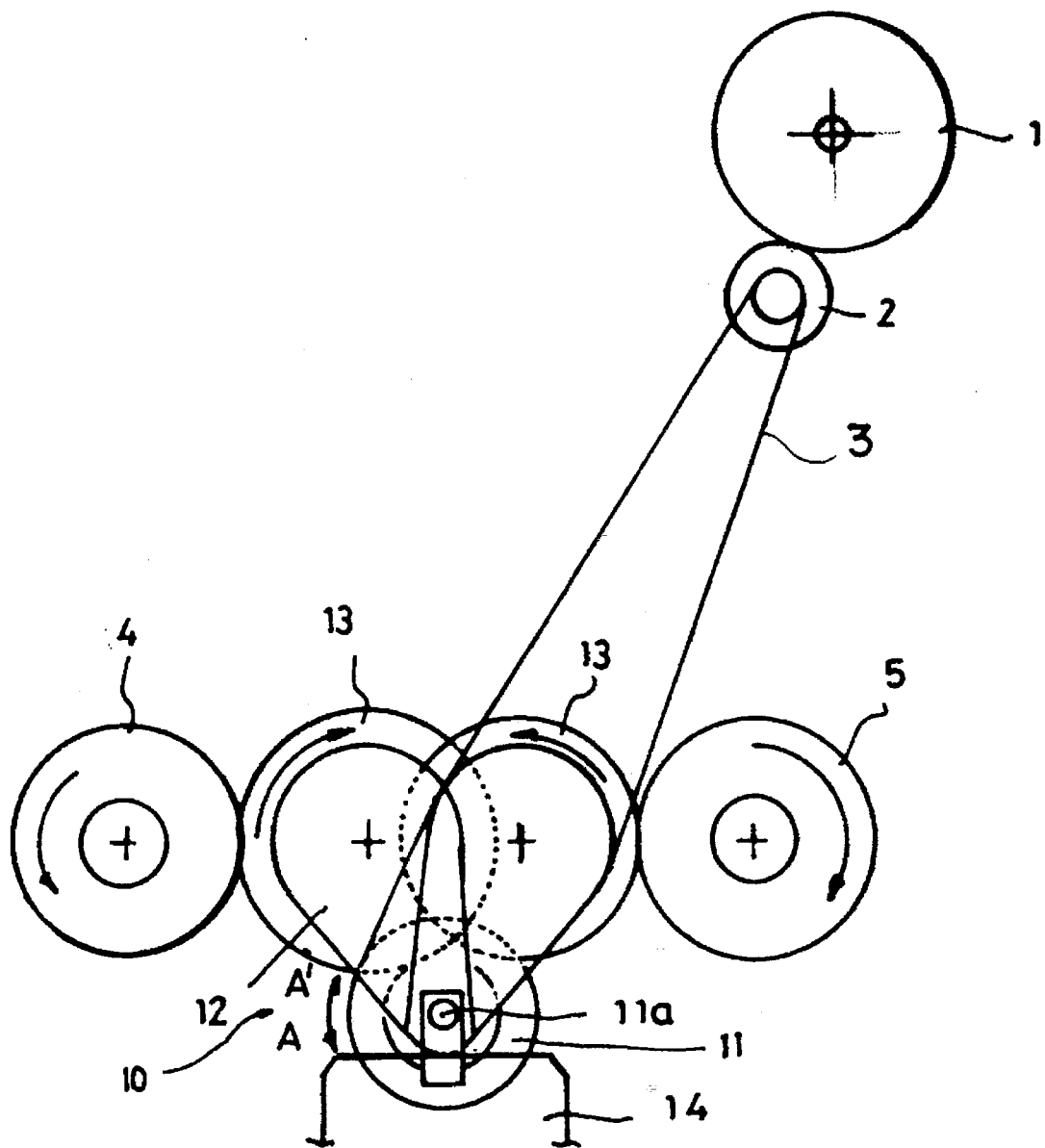
FIG. 1 is a plan view showing a conventional reel drive apparatus of a VCR.
Figure 2:
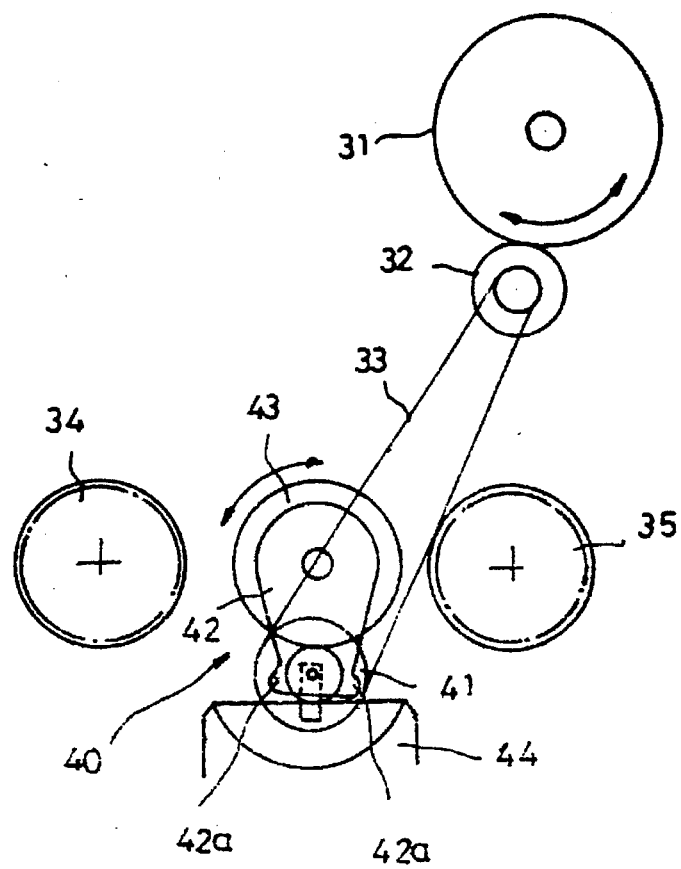
FIG. 2 is a plan view showing an idler gear transfer control apparatus according to the embodiments of the present invention.

Referring to FIG. 2, an idler gear transfer control apparatus for a reel drive apparatus of a VCR includes an output gear 32 drivingly connected to a capstan motor 31, and an idler unit 40 drivingly connected to the output gear 32 by a belt 33.

The idler unit 40 includes an input gear 41 having a pulley for receiving a driving force of the output gear 32 through the belt 33, an idler arm 42 pivotally engaged at an inner end thereof to a shaft 41a of the input gear 41, and an idler gear 43 disposed at an outer end of the idler arm 42 and drivingly engaged to the input gear 41.

A cassette lock release 44 is fixed to the shaft 41a of the input gear 41, and the idler gear 43 is spaced apart from the supply reel gear 34 and the take-up reel gear 35.

A plurality of spaced-apart stoppers 42a are formed at the inner end of the idler arm 42 about the shaft 41a of the input gear 41.

The operation of the idler gear transfer control apparatus for a reel drive apparatus of a VCR according to the present invention will now be explained.

The output gear 32 rotates by a driving force of the capstan motor 31, and the driving force is transferred to the input gear 41 through the belt 33 and is selectively transferred to the supply reel gear 34 or the take-up reel gear 35 by the idler gear 43.

Figure 3A:
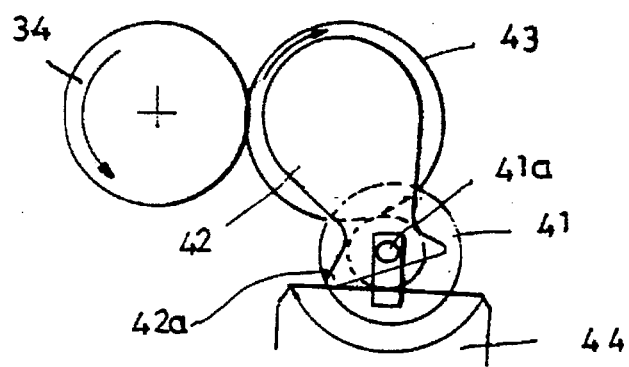
FIG. 3A is a plan view showing an idler gear contacting with a supply reel gear of an idler gear transfer control apparatus for a reel drive apparatus of a VCR according to the present invention.

In more detail, when the input gear 41 rotates in the direction of the arrow as shown in FIG. 3A, the idler arm 42 moves to the left, and the idler gear 43 comes into driving contact with the supply reel gear 34.

Therefore, the idler gear 43 and the supply reel gear 34 rotate in the direction of the arrows as shown in FIG. 3A.

In addition, the stoppers 42a provided on the idler arm 42 come into contact with a predetermined portion of the cassette lock release 44 fixed to the shaft 41a of the input gear 41, and the idler gear 43 becomes inclined to the supply reel gear 34 at a predetermined angle as much as the idler gear 43 is substantially engaged with the supply reel gear 34, so that there is maintained a predetermined distance between the supply reel gear 34 and the idler gear 43 for a better and steady driving engagement therebetween. That is, the idler gear 43 is prevented moving too close to the rear supply gear 34.

Figure 3B:
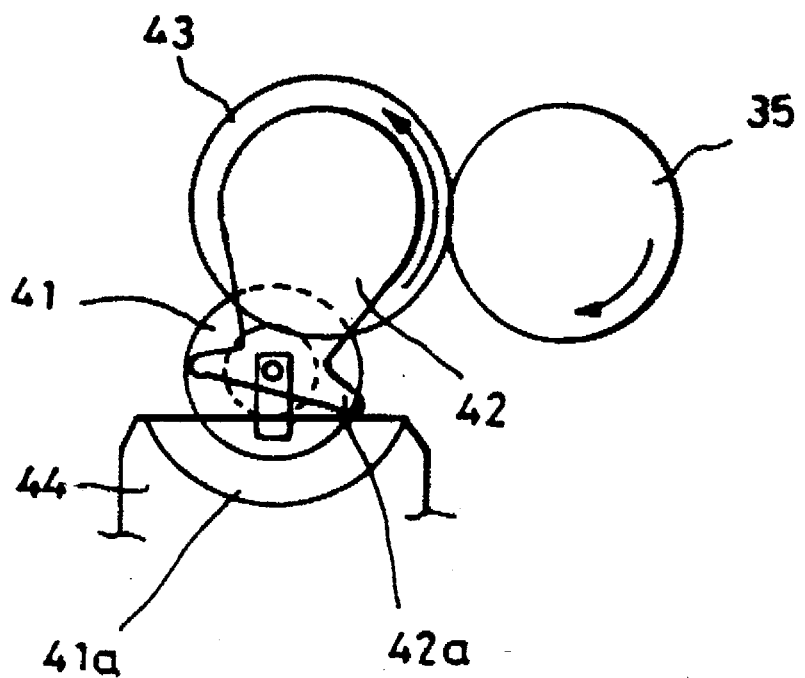
FIG. 3B is a plan view showing an idler gear contacting with a take-up reel gear of an idler gear transfer control apparatus for a reel drive apparatus of a VCR according to the present invention.

Meanwhile, as shown in FIG. 3B, when the driving force of the idler gear 43 is transferred to the take-up reel gear 35, the corresponding operation as above-described is performed, so that there is maintained a predetermined distance between the take-up reel gear 35 and the idler gear 43 for a better and steady driving engagement therebetween. That is, the idler gear 43 is prevented from approaching too close to the take-up rear gear 35.

As described above, the idler gear transfer control apparatus for a reel drive apparatus of a VCR according to the present invention is directed to preventing generation of an audible noise in the system and occurrence of malfunction in the same by providing plurality of stoppers at the lower portion of the idler arm so that a predetermined distance can be maintained respectively between the idler gear and the supply reel gear and between the idler gear and the take-up reel gear.

In addition, since a more stable tape running can be achieved, it is possible to prevent a tape damage and to achieve a proper tape tension, thus increasing a quality video running state.

Moreover, since the stoppers and the idler gear are integrally formed, a more compact system can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An idler gear transfer control apparatus for a reel drive apparatus of a VCR, wherein the VCR includes a reversible motor, a base, a shaft disposed at the base, an input gear rotatably disposed on the shaft for receiving a driving force from the motor, and an idler arm having one end rotatably connected to the shaft and another end carrying an idler gear connected to the input gear, the idler arm being movable about the shaft for engaging the input gear, the idler arm being movable about the shaft for engaging the idler gear selectively with a supply reel gear or a take-up reel gear, whereby the driving force of the motor is selectively transferred to the supply reel gear or the take-up reel gear in accordance with a rotation direction of the input gear, said apparatus comprising:

a plurality of stoppers provided at the one end of the idler arm connected to the shaft for limiting the movements of the idler arm; and a cassette lock release having a flat top surface for selectively engaging with the stoppers, the idler gear being moved by the driving force of the motor and contacting the supply reel gear or the take-up reel gear before or at a same time one of the stoppers contacts the flat top surface of the cassette lock release.

2. The apparatus of claim 1, wherein said stoppers are spaced apart from each other about the shaft of the input gear.

3. The apparatus of claim 1, wherein the idler gear contacts either the supply reel gear or the take-up reel gear before or at a substantially same time another one of the stoppers contacts the flat top surface of the cassette lock release.

4. The apparatus of claim 3, wherein the idler arm includes a flat bottom surface and the stoppers disposed at ends of the flat bottom surface, the flat bottom surface of the idler arm being substantially parallel to the flat top surface of the cassette lock release when the idler gear is positioned substantially in the middle between the take-up reel gear and the supply reel gear.

5. The apparatus of claim 4, wherein there are two stoppers provided at the idler arm.

6. The apparatus of claim 5, wherein the idler arm has a fish shape.

7. The apparatus of claim 1, wherein the idler gear contacts one of the supply reel gear and the take-up reel gear always before the one of the stoppers contacts the flat top surface of the cassette lock release.

8. An idler gear transfer control apparatus for a reel drive apparatus of a VCR, wherein the VCR includes a motor, an input gear rotatably engaging the motor, an idler gear being movable to selectively operate with one of a supply reel gear and a take-up reel gear, and a shaft for transferring a driving force of the motor to the idler gear through an output gear, said apparatus comprising:

an idler arm disposed on the shaft for receiving the driving force of the motor, said idler arm having an upper portion rotatably connected to the idler gear and a lower portion connected to the shaft for moving the idler gear, the lower portion of the idler arm including first and second stoppers provided at opposite ends of the lower portion of the idler arm; and a flat surfaced element for selectively engaging with the first and second stoppers, whereby the idler gear contacts either the supply reel gear or the take-up reel gear before or at a same time the first stopper contacts the flat surfaced element.

9. The apparatus of claim 8, wherein the idler gear contacts either the supply reel gear or the take-up reel gear before or at a substantially same time the second stopper contacts the flat surfaced element.

10. The apparatus of claim 9, wherein the flat surfaced element is a cassette lock release having a flat top surface for the first and second stoppers to contact.

11. The apparatus of claim 10, wherein the idler arm includes a flat bottom surface and the stoppers disposed at ends of the flat bottom surface, the flat bottom surface of the arm idler being substantially parallel to the flat top surface of the cassette lock release when the idler gear is positioned substantially in the middle between the take-up reel gear and the supply reel gear.

12. The apparatus of claim 10, wherein the idler arm has a fish shape.

13. The apparatus of claim 8, wherein the idler gear contacts one of the supply reel gear and the take-up reel gear always before one of the stoppers contacts the flat surfaced element.

14. A method of transferring an idler gear for a reel drive apparatus of a VCR, wherein the VCR includes a motor, an input gear rotatably engaging the motor, an idler gear being movable to selectively operate with one of a supply reel gear and a take-up reel gear, and a shaft for transferring a driving force of the motor to the idler gear through an output gear, said method comprising the steps of:

disposing an idler arm on the shaft for receiving the driving force of the motor, said idler arm having an upper portion rotatably connected to the idler gear and a lower portion connected to the shaft for moving the idler gear, the lower portion of said idler arm including first and second stoppers provided at opposite ends of the lower portion of said idler arm; and providing a flat surfaced element for selectively engaging with the first and second stoppers, whereby the idler gear contacts either the supply reel gear or the take-up reel gear before or at a same time the first stopper contacts the flat surfaced element.

15. The method of claim 14, wherein the idler gear contacts either the supply reel gear or the take-up reel gear before or at a substantially same time the second stopper contacts the flat surfaced element.

16. The method of claim 15, wherein the flat surfaced element is a cassette lock release having a flat top surface for the first and second stoppers to contact.

17. The method of claim 16, wherein said disposing step includes the step of:

providing the idler arm having a flat bottom surface and the stoppers disposed at ends of the flat bottom surface, the flat bottom surface of the arm idler being substantially parallel to the flat top surface of the cassette lock release when the idler gear is positioned substantially in the middle between the take-up reel gear and the supply reel gear.

18. The method of claim 16, wherein the idler arm has a fish shape.

19. The method of claim 14, wherein the idler gear contacts one of the supply reel gear and the take-up reel gear always before one of the stoppers contacts the flat surfaced element.

* * * * *